United States Patent [19]

Orikasa et al.

[11] Patent Number: 4,987,165
[45] Date of Patent: Jan. 22, 1991

[54] THERMOPLASTIC RESIN COMPOSITION AND METHOD FOR PREPARING THE SAME

[75] Inventors: Yuichi Orikasa, Yokohama; Suehiro Sakazume, Fujisawa, both of Japan

[73] Assignees: Nippon Petrochemicals Co., Ltd.; Nippon Oil & Fats Co., Ltd., both of Japan

[21] Appl. No.: 414,118

[22] Filed: Sep. 28, 1989

[30] Foreign Application Priority Data

Sep. 28, 1989 [JP] Japan ............................ 63-243336

[51] Int. Cl.⁵ ..................... C08L 81/06; C08L 63/10; C08L 55/02
[52] U.S. Cl. ............................ 523/435; 525/189; 525/74; 525/64; 525/208
[58] Field of Search ................. 525/189, 74, 64, 208; 523/435

[56] References Cited

U.S. PATENT DOCUMENTS

| | | | |
|---|---|---|---|
| 3,915,929 | 10/1975 | Kishikawa et al. | 525/208 |
| 4,444,950 | 4/1984 | Sakano et al. | 525/74 |
| 4,554,316 | 11/1985 | Sakano et al. | 525/74 |
| 4,758,629 | 7/1988 | Deyrup et al. | 525/208 |

FOREIGN PATENT DOCUMENTS

| | | | |
|---|---|---|---|
| 3340591 | 5/1984 | Fed. Rep. of Germany | 525/74 |
| 57-123251 | 7/1982 | Japan | 525/189 |
| 58-125736 | 7/1983 | Japan | 525/189 |
| 61-34037 | 2/1986 | Japan | 525/208 |
| 1-256550 | 10/1989 | Japan | 525/208 |
| 1196066 | 6/1970 | United Kingdom | |

Primary Examiner—John C. Bleutge
Assistant Examiner—David C. Rowley
Attorney, Agent, or Firm—Ostrolenk, Faber, Gerb & Soffen

[57] ABSTRACT

A novel thermoplastic resin composition is here disclosed which contains (I) 99 to 1% by weight of a polysulfone or polyether sulfone; (II) 1 to 99% by weight of an acrylonitrile-butadiene-styrene resin; (III) 0.1 to 100 parts by weight, based on 100 parts by weight of the aforesaid resin (I)+(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either of the polymer or copolymer being in the state of a dispersion phase having a particle diameter of 0.001 to 10 μm; and (IV) 0 to 150 parts of an inorganic filler.

Furthermore, a method for preparing the aforesaid composition is also disclosed.

10 Claims, No Drawings

THERMOPLASTIC RESIN COMPOSITION AND METHOD FOR PREPARING THE SAME

BACKGROUND OF THE INVENTION

(1) Field of the Invention

The present invention relates to a thermoplastic resin composition having excellent heat resistance and impact resistance, and a method for preparing the same. This composition of the present case can be widely utilized as materials for electrical and electronic machine parts, automobile parts and the like.

(2) Description of the Prior Art

Polysulfones and polyether sulfones are known as engineering plastics having excellent hot water resistance, heat resistance and demensional stability, but they are not always sufficient in impact resistance, particularly notched impact strength and are poor in flowability and moldability. Thus, attempts have been made to eliminate these faults by mixing an acrylonitrile-butadiene-styrene resin (ABS resin) therewith. In Japanese Patent Publication No. 37896/1971, it is described that when the polysulfone is mixed with the ABS resin, a composition having excellent flowability, impact strength, bending strength and heat resistance can be obtained.

However, such a technique is insufficient to satisfy the requirements of the heightened impact resistance in recent years, and materials having higher impact strength are demanded.

SUMMARY OF THE INVENTION

The inventors of the present application have intensively researched to achieve the above-mentioned object, and as a result, they have found that when a specific multiphase structure thermoplastic resin as a compatibilizing agent is mixed with a polysulfone or polyether sulfone and an acrylonitrile-butadiene-styrene resin, the compatibility of the polysulfone or polyether sulfone with the acrylonitrile-butadiene-styrene resin can be improved. In consequence, a thermoplastic resin composition has been accomplished which simultaneously has excellent hot water resistance, autolysis and dimensional stability of the polysulfone or polyether sulfone as well as excellent impact resistance, moldabilty and chemical resistance of the acrylonitrile-butadiene-styrene resin.

That is, a first aspect of the present invention is directed to a thermoplastic resin composition containing (I) 99 to 1% by weight of a polysulfone or polyether sulfone, (II) 1 to 99% by weight of an acrylonitrile-butadiene-styrene resin, (III) 0.1 to 100 parts by weight, based on 100 parts by weight of the aforesaid resins (I)+(II), of a multiphase structure thermoplastic resin which is composed of 5 to 95% by weight of an epoxy group-containing olefin copolymer and 95 to 5% by weight of a vinyl polymer or copolymer obtained from at least one kind of vinyl monomer, either of the polymer or copolymer being in the state of a dispersion phase having a particle diameter of 0.001 to 10 μm, and (IV) 0 to 150 parts of an inorganic filler.

The second aspect of the present invention is directed to a method for preparing a thermoplastic resin composition which comprises the step of melting and mixing a polysulfone or polyether sulfone (I) and an acrylonitrile-butadiene-styrene resin (II) with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator, and raising the temperature of this aqueous suspension, when the degree of the impregnation has reached 50% by weight of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of the epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100° to 300° C. in order to form a multi-phase structure thermoplastic resin (III), and then melting and mixing the resin (III) with the resins (I) and (II).

DETAILED DESCRIPTION OF THE INVENTION

A thermoplastic polysulfone resin used in the present invention is a polymer material having a fundamental structure which comprises the repeating unit represented by the formula

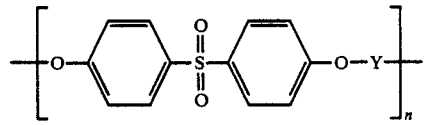

wherein Y is a residual group of a divalent polynuclear phenol having an aliphatic residual group in its skeleton from which two OH groups are removed, and n is an integer indicating a polymerization degree, preferably more than 50, more preferably from about 50 to 80, which is usually sufficiently great to provide the solid polymer.

Specific examples of the divalent polynuclear phenol which can be used to provide the Y component include 2,2-bis-(4-hydroxylphenyl)propane, 2,4'-dihydroxydiphenylmethane, bis-(2-hydroxyphenyl)methane, bis-(4-hydroxyphenyl)methane, bis-(4-hydroxy-2,6-dimethyl-3-methoxyphenyl)methane, 1,1-bis-(p-hydroxyphenyl)ethane, 1,2-bis-(4-hydroxyphenyl)ethane, 1,1-bis-(4-hydroxy-2-chlorophenyl)-ethane, 1,1-bis-(3-methyl-4-hydroxyphenyl)ethane, 1,3-bis(3-methyl-4-hydroxyphenyl)propane, 2,2-bis-(3-isopropyl-4-hydroxylphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)-pentane, 2,2-bis-(4-hydroxyphenyl)heptane, bis-(4-hydroxyphenyl)phenylmethane, bis-(4-hydroxyphenyl)cyclohexylmethane, 1,2-bis-(4-hydroxylphenyl)-1,2-bis-(phenyl)propane, 2,2-bis-(4-hydroxyphenyl)-1-phenylpropane, 1,1-bis-(4-hydroxyphenyl)-cyclohexane and 4,4-dihydroxydiphenylsulfone.

From both the viewpoints of usefulness and availability, the preferable polysulfone has a repeating unit represented by the following formula:

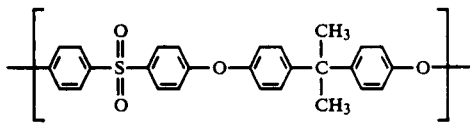

The polyether sulfone used in the present invention is a thermoplastic aromatic polyether sulfone comprising any one or a combination of the following repeating units I, II and III

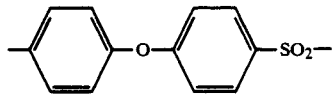

I

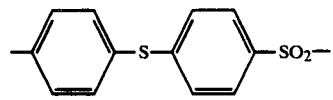

II

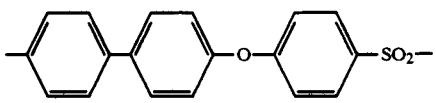

III

The acrylonitrile-butadiene-styrene resin (ABS resin) used in the present invention is a graft copolymer (c) obtained by polymerizing, in the presence of a conjugated diene rubber, two or more kinds of compounds selected from the group consisting of vinyl cyanide compounds, aromatic vinyl compounds and alkyl ester compounds of unsaturated carboxylic acids. If necessary, the ABS resin may contain a copolymer (d) obtained by polymerizing two or more compounds selected from the group consisting of vinyl cyanide compounds, aromatic vinyl compounds and alkyl ester compounds of unsaturated carboxylic acids.

The composition ratio between the conjugated diene rubber and the above-mentioned compounds in the graft copolymer (c) is not limited particularly, but it is preferred that the conjugated diene rubber is in a ratio of 5 to 80% by weight and the above-mentioned compounds are in a ratio of 95 to 80% by weight. Furthermore, the preferable composition ratio of the above-mentioned compounds is 0 to 30% by weight of the vinyl cyanide compound, 30 to 80% by weight of the aromatic vinyl compound and 0 to 70% by weight of the alkyl ester compound of the unsaturated carboxylic acid. Incidentally, the particle diameter of the conjugated diene rubber is not limited particularly, but it is preferably in the range of 0.05 to 1 μm. The preferable composition ratio of the above-mentioned compounds constituting the copolymer (d) is 0 to 30% by weight of the vinyl cyanide compound, 50 to 90% by weight of the aromatic vinyl compound and 0 to 40% by weight of the alkyl ester compound of unsaturated carboxylic acid. The intrinsic viscosity [30° C., dimethylformamide (DMF)] of the copolymer (d) is not limited particularly, either, but it is preferably in the range of 0.25 to 1.0.

Examples of the conjugated diene rubber include polybutadiene, butadiene-styrene copolymer and acrylonitrile-butadiene copolymer. Examples of the vinyl cyanide compound include acrylonitrile and methacrylonitrile, and examples of the aromatic vinyl compound include styrene, α-methylstyrene, vinyltoluene, dimethylstyrene and chlorostyrene. Moreover, examples of the alkyl ester compound of the unsaturated carboxylic acid include methyl acrylate, ethyl acrylate, butyl acrylate, methyl methacrylate and hydroxyethyl acrylate.

The ABS resin (II) may be prepared by an emulsion polymerization process, a suspension polymerization process, a solution polymerization, a mass polymerization, an emulsion-suspension polymerization process or the like.

The epoxy group-containing olefin copolymer used in the multi-phase structure thermoplastic resin regarding the present invention is a copolymer of an olefin formed by a high-pressure radical polymerization and an unsaturated glycidyl group-containing monomer, or a terpolymer of an olefin, an unsaturated glycidyl group-containing monomer and another unsaturated monomer, or a multicomponent copolymer. The particularly preferable olefin of the copolymer is ethylene, and the preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of α-chloroallyl, maleic acid, crotonic acid and fumaric acid, allyl glycidyl ether, glycidyloxy ethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, α,β-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and vinyl ethyl ether, and acrylic amide compounds. Particularly, acrylic and methacrylic esters are preferable.

Typical examples of the epoxy group-containing olefin copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethylene-glycidyl methacrylate copolymer, ethylene-ethyl acrylate-glycidyl methacrylate copolymer and ethylene-vinyl acetate-glycidyl methacrylate copolymer are preferred.

These epoxy group-containing olefin copolymers can be used in a mixture thereof.

The epoxy group-containing olefin copolymer may be prepared by a high-pressure radical polymerization, i.e., by simultaneously or stepwise contacting and polymerizing a monomer mixture of 60 to 99.5% by weight of the abovementioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg cm$^2$, preferably 1,000 to 3,500 kg/cm$^2$, at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Additional examples of the epoxy group-containing olefin copolymer of the present invention include modified compounds prepared by the addition reaction of the abovementioned unsaturated glycidyl group-containing monomers to conventional olefin homopolymers and copolymers.

Examples of the above-mentioned olefin homopolymer or copolymer include homopolymers such as low-density, medium-density and high-density polyethylenes, polypropylenes, polybutene-1 and poly-4-methylpentene-1, copolymers mainly comprising ethylene and other α-olefins such as ethylene-propylene copolymer, ethylene-butene-1 copolymer, ethylene-hexene-1 copolymer, ethylene-4-methylpentene-1 copolymer and ethylene-octene-1 copolymer, a copolymer mainly comprising propylene and another α-olefin such as propylene-ethylene block copolymer, copolymers with esters such as ethylene-vinyl acetate copolymer, ethylene-acrylic acid copolymer, ethylene-methacrylic acid copolymer, copolymers of ethylene and methyl, ethyl, propyl, isopropyl and butyl acrylate and methacrylate, ethylene-maleic acid copolymer, ethylene-propylene copolymer rubber, ethylene-propylene-diene-copolymer rubber, liquid polybutadiene, etylene-vinyl acetate-vinyl chloride copolymer and mixtures thereof.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene, as well as acrylonitrile and methacrylonitrile monomers.

The multi-phase structure thermoplastic resin (III) used in the present invention is an epoxy group-containing olefin copolymer or a vinyl polymer or copolymer matrix in which another vinyl polymer or copolymer or epoxy group-containing olefin copolymer is uniformly dispersed in a spherical form.

The polymer dispersed in the multi-phase structure thermoplastic resin has a particle diameter of 0.001 to 10 $\mu$m, preferably 0.01 to 5 $\mu$m. When the particle diameter of the dispersed polymer is less than 0.001 $\mu$m or is more than 10 $\mu$m, the compatibility of the polysulfone or polyether sulfone with the acrylonitrile-butadiene-styrene resin is insufficient, so that impact resistance deteriorates and delamination occurs.

The vinyl polymer or copolymer in the multi-phase thermoplastic resin (III) used in the present invention has a number average polymerization degree of 5 to 10,000, preferably 10 to 5,000.

When the number average polymerization degree is less than 5, heat resistance of the thermoplastic resin composition regarding the present invention deteriorates unpreferably, though impact resistance can be improved. Inversely, when it is in excess of 10,000, melting viscosity is high, moldability deteriorates, and surface gloss falls off unpreferably.

The multi-phase thermoplastic resin used in the present invention comprises 5 to 95% by weight, preferably 20 to 90% by weight of the epoxy group-containing olefin copolymer and 95 to 5% by weight, preferably 80 to 10% by weight of the vinyl polymer or copolymer. When the content of the epoxy group-containing olefin copolymer is less than 5% by weight, the improvement effect of impact resistance is unpreferably insufficient. When it is more than 95% by weight, heat resistance and dimensional stability of the thermoplastic resin composition regarding the present invention are impaired unpreferably.

As a grafting technique used to prepare the multiphase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an epoxy group-containing olefin copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the epoxy group-containing olefin copolymer, thereby obtaining a graft polymerization precursor (A). This graft polymerization precursor also is the multi-phase structure thermoplastic resin. Therefore, the graft polymerization precursor (A) may be directly melted and mixed with the polysulfone or polyether sulfone and the acrylonitrile-butadiene-styrene resin.

Furthermore, the multi-phase structure thermoplastic resin (III) of the present invention may be prepared by kneading the graft polymerization precursor (A) under melting at 100° to 300° C. At this time, the graft polymerization precursor may be mixed with the epoxy group-containing olefin copolymer (B) or the vinyl polymer or copolymer (C) and the mixture may be then kneaded under melting in order to similarly obtain the multi-phase structure thermoplastic resin (III). Most preferable is the multi-phase structure thermoplastic resin obtained by kneading the graft polymerization precursor.

The above-mentioned radical polymerizable or copolymerizable organic peroxide is a compound represented by the general formula (a):

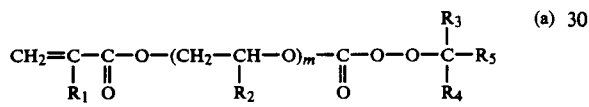

wherein $R_1$ is a hydrogen atom or an alkyl group having 1 or 2 carbon atoms, $R_2$ is a hydrogen atom or a methyl group, each of $R_3$ and $R_4$ is an alkyl group having 1 to 4 carbon atoms, $R_5$ is an alkyl group having 1 to 12 carbon atoms, a phenyl group, an alkyl-substituted phenyl group or a cycloalkyl group having 3 to 12 carbon atoms, and m is 1 or 2.

Alternatively, the radical polymerizable or copolymerizable organic peroxide is a compound represented by the general formula (b):

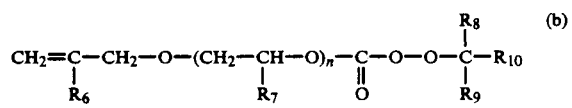

wherein $R_6$ is a hydrogen atom or an alkyl group having 1 or 4 carbon atoms, $R_7$ is a hydrogen atom or a methyl group, each of $R_8$ and $R_9$ is an alkyl group having 1 to 4 carbon atoms, $R_{10}$ is an alkyl group having 1 to 12 carbon atoms, a phenyl group, an alkyl-substituted phenyl group or a cycloalkyl group having 3 to 12 carbon atoms, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate, t-hexylperoxymethacyloyloxyethyl carbonate, 1,1,3,3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylcumylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylcumylperoxymethacryloyloxyethoxyethyl carbonate, t-butylperoxyacryloyloxyisopropyl carbonate, t-amylperoxymacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate and p-isopropylcumylperoxymethacryloyloxyisopropyl carbonate.

Typical examples of the compounds represented by the general formula (b) include t-butylperoxyallyl carbonate, t-amylperoxyallylccarbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-hexylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyacryloyloxyisopropyl carbonate, t-amylperoxyacryloyloxyisopropyl carbonate, t-hexylperoxyacryloyloxyisopropyl carbonate, t-butylperoxymethacryloyloxyisopropyl carbonate, t-amylperoxymethacryloyloxyisopropyl carbonate and t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxmethallyl carbonate.

In the present invention, the inorganic filler (IV) can be used in an amount of 0 to 150 parts by weight based on 100 parts of the components (I)+(II)+(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

The thermoplastic composition of the present invention can be prepared by melting/mixing the above-mentioned resin compositions (I)+(II)+(III) at a temperature of 250° to 350° C.

With regard to the order of the melting/mixing of the respective components, all of them may be melted/mixed simultaneously, or alternatively either of the polysulfone and the polyether sulfone or the acrylonitrile-butadiene-styrene resin is first melted/mixed with the multi-phase structure thermoplastic resin, and the mixture is then mixed with the other resin.

In melting and mixing, there may be used a usual kneader such as mixing rolls, a Banbury's mixer, a pressing kneader, a kneading extruder and a twin-screw extruder.

In the present invention, the following materials can be additionally used, in so far as they do not deviate from the gist of the present invention. Examples of such materials include polyolefin resin, polyvinyl chloride resin, polyvinylidene chloride resin, polyamide resin, polyphenylene sulfide resin, aromatic polyester resin, natural rubber, synthetic rubber, inorganic flame retardants such as magnesium hydroxide and aluminum hydroxide, organic flame retardants containing halogens, phosphorus and the like, organic and inorganic fillers such as metallic powder, talc, glass fiber, carbon fiber and wood meal, and additives such as an antioxidant, an ultraviolet inhibitor, a lubricant, a coupling agent, a dispersant, a foaming agent, a crosslinking agent and a colorant.

Now, the present invention will be described in detail in reference to examples.

Reference Example 1 [Preparation of Multi-phase Structure Thermoplastic Resin (III)]

In a 5-liter stainless steel autoclave was placed 2,500 g of pure water, and 2.5 g of polyvinyl alcohol was further dissolved therein as a suspending agent. In the solution was then placed 700 g of ethylene/glycidyl methacrylate copolymer (glycidyl methacrylate content=15% by weight; trade name Rexpearl RA3150; made by Nippon Petrochemicals Co., Ltd.) as an epoxy group-containing olefin copolymer, followed by stirring to suspend the copolymer therein in a nitrogen atmosphere.

Separately, in 300 g of mixture of styrene and acrylonitrile [styrene/acrylonitrile ratio is 70/30 (wt/wt)] as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the epoxy group-containing olefin copolymer was impregnated with the vinyl monomer containing the radical polymerization initiator and the radical polymerizable or copolymerizable organic peroxide After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor.

This precursor was then extracted with ethyl acetate in order to obtain styrene/acrylonitrile copolymer solution, and this solution was further placed in methanol to obtain a white powdery polymer. Afterward, the graft polymerization precursor was further extracted with xylene by the use of a Soxhlet extractor, and at this time, any xylene-insoluble material was not present therein.

Next, this graft polymerization precursor was extruded at 200° C. by a plastomill single-screw extruder (Toyo Seiki Seisaku-sho Ltd.) to perform graft reaction, whereby a multi-phase structure thermoplastic resin (III) was obtained.

This multi-phase structure thermoplastic resin was then observed by a scanning type electron microscope (trade name JEOL JSM T300; made by JEOL, Ltd.), and it was found that it was a multi-phase structure thermoplastic resin in which spherical resin particles each having a diameter of 0.3 to 0.4 μm were uniformly dispersed.

In this case, the grafting efficiency of the styrene polymer was 77.1% by weight.

Examples 1 to 10

In each example, a polysulfone of MFR 6.5 (Yudelpolysulfone P-1700; made by Union Carbide Corp.), an ABS resin having a composition shown in Table 1 and the multi-phase structure thermoplastic resin were melted and mixed in a ratio shown in Table 2.

The melting/mixing process was carried out by feeding the materials into a one-directional twin-screw extruder having a cylinder temperature of 250° C. and a screw diameter of 30 mm (Plastic Engineering Laboratory Co., Ltd.), and then melting/mixing the materials therein. The thus mixed resin was formed to grains, and the latter were then subjected to injection molding so as to prepare specimens. Sizes of the specimens and test procedures were as follows:

Specimens for notched izod impact strength:
. . . 13 mm×65 mm×6 mm (JIS K7110) Specimens for heat distortion temperature:
. . . 13 mm×130 mm×6 mm (JIS k7207)

In addition, delamination was evaluated by observing the rupture cross-section of each specimen. The composition of the used ABS resin was as follows:

TABLE 1

| Component | Ratio |
|---|---|
| Acrylonitrile | 20 |
| Styrene | 55 |
| α-Methylstyrene | 0 |
| Polybutadiene | 25 |
| (Intrinsic Viscosity | 0.60) |

TABLE 2

| Example | 1 | 2 | 3 | 4 | 5 | 6 | 7 | 8 | 9 | 10 |
|---|---|---|---|---|---|---|---|---|---|---|
| ABS Resin (wt %) | 80 | 80 | 70 | 70 | 50 | 50 | 30 | 30 | 20 | 20 |
| Polysufone (wt %) | 20 | 20 | 30 | 30 | 50 | 50 | 70 | 70 | 80 | 80 |
| Multi-Phase Structure Themoplastic Resin (III) (pts. wt.) | 10 | 20 | 10 | 20 | 10 | 20 | 10 | 20 | 10 | 20 |
| Izod Impact Strength (kg.cm/cm) | 40 | 45 | 35 | 38 | 30 | 34 | 23 | 27 | 18 | 20 |
| Heat Distortion Temp. (°C.) (18.6 kg/cm$^2$) | 100 | 98 | 102 | 99 | 125 | 130 | 145 | 140 | 155 | 160 |
| Delamination | none | none | none | none | none | none | none | none | none | none |

Examples 11 to 17

The same procedure as in above-mentioned examples was repeated with the exception that the polysulfone was replaced with a polyether sulfone (VICTREX 4100G; made by ICI Japan Co., Ltd.). The results are set forth in Table 3.

TABLE 3

| Example | 11 | 12 | 13 | 14 | 15 | 16 | 17 |
|---|---|---|---|---|---|---|---|
| ABS Resin (wt %) | 80 | 80 | 70 | 50 | 30 | 20 | 10 |
| Polyether Sulfone (wt %) | 20 | 20 | 30 | 50 | 70 | 80 | 90 |
| Multi-Phase Structure Themoplastic Resin (III) (pts. wt.) | 20 | 10 | 20 | 20 | 10 | 10 | 10 |
| Izod Impact Strength (kg.cm/cm) | 40 | 35 | 35 | 30 | 20 | 17 | 15 |
| Heat Distortion Temp. (°C.) (18.6 kg/cm$^2$) | 100 | 103 | 115 | 140 | 160 | 175 | 195 |
| Delamination | none | none | none | none | none | none | none |

Comparative Examples 1 to 10

In contrast to the above-mentioned examples, ethylene-glycidyl methacrylate copolymer was used. The results are set forth in Table 4.

TABLE 4

| Comp. Ex. | 1 | 2 | 3 | 4 | 5 | 6 | 7 | 8 | 9 | 10 |
|---|---|---|---|---|---|---|---|---|---|---|
| ABS Resin (wt %) | 80 | 80 | 80 | 70 | 70 | 50 | 50 | 30 | 30 | 30 |
| Polysufone (wt %) | 20 | 20 | 0 | 30 | 0 | 50 | 0 | 70 | 0 | 0 |
| Polyether Sulfone (wt %) | 0 | 0 | 20 | 0 | 30 | 0 | 50 | 0 | 70 | 70 |
| Ethylene-Glycidyl Methacrylate Copolymer* (pts. wt.) | 0 | 15 | 0 | 15 | 15 | 10 | 10 | 10 | 10 | 0 |
| Izod Impact Strength (kg.cm/cm) | 3 | 9 | 6 | 8 | 6 | 5 | 6 | 3 | 5 | 3 |
| Heat Distortion Temp. (°C.) (18.6 kg/cm$^2$) | 80 | 80 | 85 | 90 | 95 | 115 | 125 | 145 | 145 | 150 |
| Delamination | In all Comp. Examples, delamination was present. | | | | | | | | | |

*The content of glycidyl methacrylate was 15 wt %.

According to the present invention, the following functional effects can be obtained.

The thermoplastic resin composition of the present invention can retain features of hot water resistance and autolysis of the polysulfone or polyether sulfone as well as impact resistance and moldability of the ABS resin. In particular, since the compatibilizing agent regarding the present invention is used in the above-mentioned composition, the impact resistance is more excellent as compared with the single use of the polysulfone or polyether sulfone. Therefore, the composition of the present invention can be widely used as materials of, for example, automobile parts, electric and electronic parts, and other industrial parts.

What is claimed is:

1. A thermoplastic resin composition containing
   (I) 99 to 1% by weight of a polysulfone or polyether sulfone,
   (II) 1 to 99% by weight of an acrylonitrile-butadiene-styrene resin, (III) 0.1 to 100 parts by weight, based on 100 parts by weight of the aforesaid resins (I)+(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either of the polymer or copolymer being in the state of a dispersion phase having a particle diameter of 0.001 to 10 μm, and (IV) 0 to 150 parts of an inorganic filler.

2. The thermoplastic resin composition according to claim 1 wherein the multi-phase structure thermoplastic resin is a mixture and/or a grafted compound prepared by melting the mixture which comprises 1 to 100% by weight of a graft polymerization precursor (A) obtained by copolymerizing at least one vinyl monomer with at least one of radical polymerizable or copolymerizable organic peroxides represented by the following general formulae (a) and (b)

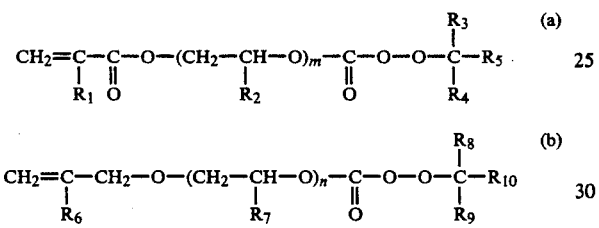

wherein $R_1$ is a hydrogen atom or an alkyl group having 1 to 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alykyl group having 1 to 12 carbon atoms, a phenyl group, an alkyl-substituted phenyl group or a cycloalkyl group having 3 to 12 carbon atoms, m is 1 or 2, and n is 0, 1 or 2 in particles of an epoxy group-containing olefin copolymer, 0 to 99% by weight of an epoxy group-containing olefin copolymer (B), and 0 to 99% by weight of a vinyl polymer or copolymer (C) obtained by polymerizing or copolymerizing at least one vinyl monomer.

3. The thermoplastic resin composition according to claim 1 wherein the epoxy group-containing olefin copolymer is composed of 60 to 99.5% by weight of ethylene, 40 to 0.5% by weight of glycidyl acrylate or methacrylate, and 0 to 39.5% by weight of another unsaturated monomer.

4. The thermoplastic resin composition according to claim 2 wherein the vinyl polymer or copolymer comprises the vinyl monomer, 50% by weight or more of which is a vinyl aromatic monomer.

5. The thermoplastic resin composition according to claim 1 wherein the vinyl monomer is at least one vinyl monomer selected from the group consisting of vinyl aromatic monomers, acrylate and methacrylate monomers, acrylonitrile and methacrylonitrile monomers, and vinyl ester monomers.

6. A method for preparing a thermoplastic resin composition which comprises the step of melting and mixing a polysulfone or polyether sulfone (I) and an acrylonitrile-butadiene-styrene resin (II) with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator, and raising the temperature of this aqueous suspension, when the degree of the impregnation has reached 50% by weight of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of the epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100° to 300° C. in order to form a multi-phase structure thermoplastic resin (III), and then melting and mixing the resin (III) with the resins (I) and (II).

7. The method for preparing a thermoplastic resin composition according to claim 6 wherein the radical polymerizable or copolymerizable organic peroxide is one kind or a mixture of two or more kinds of peroxy-carbonate compounds represented by the following general formulae (a) and (b)

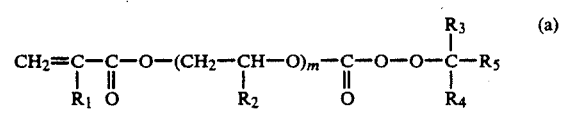

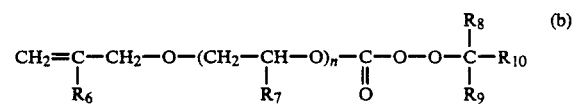

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

8. The method for preparing thermoplastic resin composition according to claim 6 wherein the vinyl monomer is at least one vinyl monomer selected from the group consisting of vinyl aromatic monomers, acrylate and methacrylate monomers, acrylonitrile and methacrylonitrile monomers, and vinyl ester monomers.

9. The method for preparing thermoplastic resin composition according to claim 6 wherein the epoxy group-containing olefin copolymer is composed of 60 to 99.5% by weight of ethylene, 40 to 0.5% by weight of glycidyl acrylate or methacrylate, and 0 to 39.5% by weight of another unsaturated monomer.

10. The method for preparing thermoplastic resin composition according to claim 6 wherein the vinyl polymer or copolymer comprises the vinyl monomer, 50% by weight or more of which is a vinyl aromatic monomer.

* * * * *